United States Patent
Kwon et al.

(10) Patent No.: US 12,011,667 B2
(45) Date of Patent: Jun. 18, 2024

(54) APPARATUS FOR GENERATING STANDARDIZED TABLE FOR CLASSIFYING THE PSYCHOLOGY OF A GAME USER AND AN OPERATION THEREOF

(71) Applicant: Sentience Inc., Seoul (KR)

(72) Inventors: Hye Min Kwon, Busan (KR); In Su Gim, Seoul (KR); Jin Kim, Goyang-si (KR); Hye Yon Kwon, Yongin-si (KR)

(73) Assignee: Sentience Inc., Seoul (KR)

( * ) Notice: Subject to any disclaimer, the term of this patent is extended or adjusted under 35 U.S.C. 154(b) by 0 days.

(21) Appl. No.: 17/565,763

(22) Filed: Dec. 30, 2021

(65) Prior Publication Data
US 2022/0323870 A1    Oct. 13, 2022

(30) Foreign Application Priority Data
Nov. 5, 2020    (KR) .................... 10-2020-0146536

(51) Int. Cl.
*A63F 13/798*    (2014.01)
*A63F 13/792*    (2014.01)

(52) U.S. Cl.
CPC .......... *A63F 13/798* (2014.09); *A63F 13/792* (2014.09)

(58) Field of Classification Search
CPC .............. A63F 13/798; A63F 13/792
See application file for complete search history.

(56) References Cited

U.S. PATENT DOCUMENTS

| | | | |
|---|---|---|---|
| 7,918,737 B2 * | 4/2011 | Hirota .................... | A63F 13/10 463/16 |
| 11,544,627 B1 * | 1/2023 | Bryce .................... | G06Q 40/06 |
| 2021/0232907 A1 * | 7/2021 | Pardeshi .................. | G06N 3/08 |

FOREIGN PATENT DOCUMENTS

| | | | |
|---|---|---|---|
| KR | 1020030031251 A | | 4/2003 |
| KR | 1020180058598 A | | 6/2018 |
| KR | 101929747 B1 | | 12/2018 |
| KR | 1020200082377 A | | 7/2020 |
| KR | 1020200124921 A | | 11/2020 |

OTHER PUBLICATIONS

Office Action of KR 10-2020-0146536 dated May 12, 2022.

* cited by examiner

*Primary Examiner* — Reginald A Renwick
(74) *Attorney, Agent, or Firm* — Dinsmore & Shohl LLP; Yongsok Choi, Esq.

(57) ABSTRACT

A method of operating a server that standardizes game data of a user to classify a user's game propensity is provided. The method includes determining whether an event occurs within a game while a user is playing the game, calling a data standardization function corresponding to an event when the event occurs within the game, acquiring at least one predetermined parameter in the data standardization function, storing the at least one parameter in a table corresponding to the event, and classifying a user's propensity based on the generated table.

6 Claims, 8 Drawing Sheets

FIG. 3

First table(310)

| User identification (ID) | Character ID | Event time | Content ID | Content level | Character ID | Loaded item ID | Loaded item quantity | ... | ... | ... |
|---|---|---|---|---|---|---|---|---|---|---|
| XXXXX | XXXXX | XXXXX | XXXXX | XXXXX | XXXXX | XXXXX | XXXXX | XXXXX | XXXXX | XXXXX |
| YYYYY | ... | ... | ... | ... | ... | ... | ... | ... | ... | ... |

311 → (first data row)
312 → (second data row)

Second table(320)

| User ID | Character ID | Event time | Billing amount | Item ID | Item category | Item quantity | Item acquisition path | ... | ... | ... |
|---|---|---|---|---|---|---|---|---|---|---|
| XXXXX | XXXXX | XXXXX | XXXXX | XXXXX | XXXXX | XXXXX | XXXXX | XXXXX | XXXXX | XXXXX |
| ... | ... | ... | ... | ... | ... | ... | ... | ... | ... | ... |

APPARATUS FOR GENERATING STANDARDIZED TABLE FOR CLASSIFYING THE PSYCHOLOGY OF A GAME USER AND AN OPERATION THEREOF

CROSS-REFERENCE TO RELATED APPLICATION

This application claims priority to and the benefit of Korean Patent Application No. 10-2020-0146536, filed on Nov. 5, 2020, the disclosure of which is incorporated herein by reference in its entirety.

BACKGROUND

1. Field of the Invention

The present disclosure relates to a game content recommendation apparatus and a method of operating a game content recommendation apparatus, and more particularly, to an apparatus and method for standardizing raw data to obtain a criterion for recommending game content according to a user's propensity.

2. Discussion of Related Art

In general, games are being widely used by the general public due to their various types of content and various contents. Conventional games are used to provide various games or amusements. In addition, games are provided to users by being divided into games played by hardcore and casual gamers, etc., according to game propensities of users or into hard, normal, easy, etc., according to the difficulty of the games. In addition, games are also classified according to age, gender, game genre, etc.

Users have propensities such as a variety of personalities or tastes that are difficult to express due to limited characters of games. However, it is difficult for users who enjoy conventional games to be provided with game services that allow the users to enjoy games according to users' propensities.

In addition, there were cases where game providers conducted surveys to learn users' propensities, but it was not easy to understand users' propensities for games due to gaps between the surveys and the games.

With the recent development of technology, an algorithm for providing a user with user-specific advertisements in games or recommending content to a user based on artificial intelligence is being developed. However, since advertisements in games have no direct relationship with the state of progress of the games, users may feel fatigued. In addition, there was a problem in that the algorithm for recommending content to a user based on artificial intelligence is machine-learned by relying only on the purchase probability and thus may not reflect the user's psychological state.

In addition, since games often include standardized stories or events, etc., users may feel averse to the games or feel bored with the games in a case where the game content does not fit their propensities or psychological states.

Accordingly, there is an increasing need for a method and apparatus for providing game content to a user according to the user's propensity. In addition, there is an increasing need for a method and apparatus for obtaining a criterion for classifying users' propensities.

SUMMARY OF THE INVENTION

According to an aspect of the present disclosure, there is provided a method of operating a server that standardizes game data of a user to classify a user's game propensity, including: determining whether an event occurs within a game while a user is playing the game, calling a data standardization function corresponding to an event when the event occurs within the game; acquiring at least one predetermined parameter in the data standardization function, storing the at least one parameter in a table corresponding to the event; and classifying a user's propensity based on the generated table.

The determining of whether the event occurs may include determining that the event has occurred within the game when an event execution function corresponding to the event is called or event occurrence information corresponding to the event is generated.

The at least one parameter may include at least one of time-related information on the event, information on a subject performing the event, and information on an object used by the subject performing the event.

The time-related information on the event may include at least one of information on an occurrence time of the event, information on an end time of the event, or information on duration of the event, the information on the subject performing the event may include at least one of information on an account of the user and information on a character, and the information on the object used by the subject performing the event may include at least one of information related to game money, information on a skill, information on an item, billing information, or information on content.

The storing of the at least one parameter in the table may include generating a table for each type of event to generate a plurality of tables, and one table included in the plurality of tables may include at least one parameter for accounts of a plurality of users.

The classifying of the user's propensity may include generating reference data, which is a criterion for classifying the user into one of a plurality of predetermined propensities based on the plurality of tables.

The classifying of the user's propensity may include acquiring feature data for the account of the user from the plurality of tables and selecting the user's propensity from among the plurality of predetermined propensities based on the reference data and the feature data for the account of the user.

The information on the account of the user may include at least one of unique identification information of the account of the user or information on a level of the account of the user, the information related to the game money may include at least one of unique identification information of the game money, information on a quantity of the game money, or information on an acquisition path of the game money, the information on the character may include at least one of unique identification information of the character, information on a category of the character, information on the level of the character, information on an acquisition path of the character, or information on an ability value of the character, the information on the skill may include at least one of unique identification information of the skill, information on a category of the skill, or information on a level of the skill, the information on the item may include at least one of a unique identifier of the item, information on a category of the item, information on a level of the item, the number of items, information on an acquisition path of the item, or a price of the item, the billing information may include information on a charge paid by the user to a game provider, and the information on the content may include at least one of unique identification information of the content, information on a category of the content, information on a difficulty level of the content, information on a time taken to complete the content, information on an entry path of the content, or information on a completion status of the content.

In addition, a program for implementing the method of operating a server as described above may be recorded on a computer-readable recording medium.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 3 is a diagram illustrating a table according to an embodiment of the present disclosure;

DETAILED DESCRIPTION OF EXEMPLARY EMBODIMENTS

Figure 1:
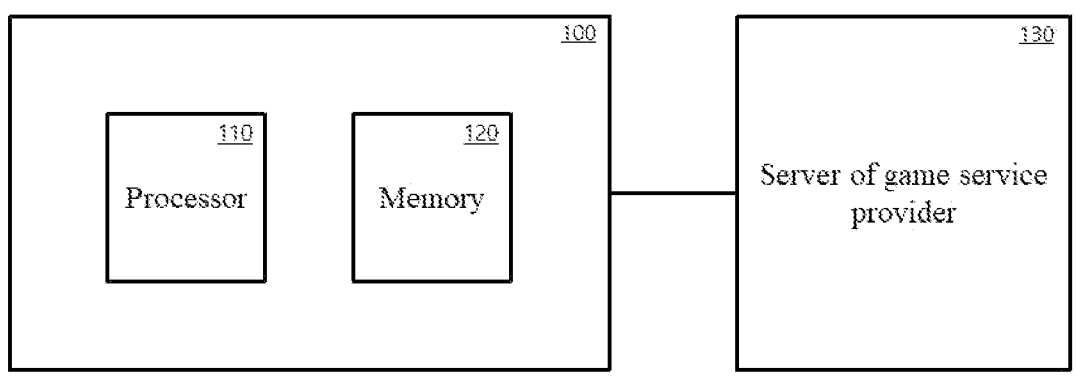
FIG. 1 is a diagram illustrating a server according to an embodiment of the present disclosure.

Various advantages and features of disclosed embodiments and methods of accomplishing them will become apparent from the following description of embodiments with reference to the accompanying drawings. However, the present disclosure is not limited to exemplary embodiments disclosed below and may be implemented in various different forms. These embodiments will be provided only in order to make the disclosure of the present invention complete and allow those skilled in the art to which the present disclosure pertains to completely recognize the scope of the present disclosure.

After terms used in the present specification are briefly described, the present disclosure will be described in detail.

General terms that are currently widely used are selected as terms used in embodiments in consideration of functions in the present specification but may be changed depending on the intention of those skilled in the art or a judicial precedent, the emergence of a new technique, and the like. In addition, in a specific case, terms arbitrarily chosen by an applicant may exist. In this case, the meaning of such terms will be described in detail in a corresponding description portion of the present disclosure. Therefore, the terms used in exemplary embodiments of the present disclosure should be defined on the basis of the meaning of the terms and the contents throughout the present disclosure rather than simple names of the terms.

In the present specification, singular forms include plural forms unless the context clearly indicates otherwise. In addition, plural forms include singular forms unless the context clearly indicates otherwise.

Throughout the specification, unless otherwise specified, "including" any component means that other components may be further included rather than excluding other components.

In this specification, "information related to a certain component" means information calculated based on a certain component, is an index corresponding to a certain component, means information including a certain component, means information having a linear relationship with a certain component or information that includes a certain component. The linear relationship may be a direct proportional relationship or an inverse proportional relationship. The information may include numerical values or text.

Also, as used herein, the term "unit" refers to a software or hardware component, and "unit" performs certain roles. However, the "unit" is not meant to be limited to software or hardware. The "unit" may be configured to be stored in a storage medium that may be addressed or may be configured to regenerate one or more processors. Accordingly, as an example, the "unit" refers to components such as software components, object-oriented software components, class components, and task components, processes, functions, attributes, procedures, subroutines, segments of program code, drivers, firmware, microcode, circuits, data, databases, data structures, tables, arrays and variables. Components and functions provided within the "unit" may be combined into a smaller number of components and the "unit" or may be further separated into additional components and the "unit."

According to an embodiment of the present disclosure, the "unit" may be implemented as a processor and a memory. The term "processor" should be interpreted broadly to include a general purpose processor, a central processing unit (CPU), a microprocessor, a digital signal processor (DSP), a controller, a microcontroller, a state machine, and the like. In some contexts, the "processor" may refer to an application specific semiconductor (ASIC), a programmable logic device (PLD), a field programmable gate array (FPGA), etc. The term "processor" may also refer to a combination of processing devices, such as a combination of a DSP and a microprocessor, a combination of a plurality of microprocessors, a combination of one or more microprocessors in combination with a DSP core, or any other such configurations.

The term "memory" should be interpreted broadly to include any electronic component capable of storing electronic information. The term memory may refer to various types of processor-readable media such as a random access memory (RAM), a read-only memory (ROM), a non-volatile random access memory (NVRAM), a programmable read-only memory (PROM), an erasable-programmable read-only memory (EPROM), an electrically erasable PROM (EEPROM), a flash memory, magnetic or optical data storage, and registers. The memory is said to be in electronic communication with a processor when the processor is capable of reading and/or writing information from and/or to the memory. The memory integrated in the processor is in electronic communication with the processor.

Hereinafter, embodiments of the disclosure will be described in detail with reference to the accompanying drawings so that those skilled in the art to which the present disclosure pertains may easily practice the present disclosure. In the drawings, parts irrelevant to the description are omitted in order to clarify the description of the present disclosure.

FIG. 1 is a diagram illustrating a server according to an embodiment of the present disclosure.

A server 100 may include a processor 110 or a memory 120. The processor 110 may perform an operation based on an instruction stored in the memory 120. However, the present disclosure is not limited thereto, and the server 100 may include only the processor 110 without including the memory. The processor 110 may be set to output a preset signal to an output line for a preset time based on the input signal. Each component of the server 100 may perform a preset operation according to a signal.

A server 130 of a game service provider may include a raw database. The raw database may store raw data. The server 100 may receive and process raw data from the server 130 of the game service provider and then transmit the processing result back to the server 130 of the game service provider. For example, the server 100 may determine a user's propensity as one of a plurality of propensities by applying a predetermined criterion to user's raw data. In addition, the server 100 may select at least one propensity from among a plurality of predetermined propensities by applying feature data for a user's account to a propensity analysis model. The feature data for the user's account may be data obtained based on user's log data. The server 100 may recommend content or items to a user based on a user's propensity. In this way, a game service provider may provide a user with content and items based on behavioral economics.

The server 130 of the game service provider may store a very large amount of log data in the raw database in real time within a short time. The log data stored in the raw database is data related to an activity of a user (gamer) within a game. Log data stored in the raw database may be called raw data in that the log data is unprocessed data. The log data included in the raw database may include metadata of a game, play records of a game, or data related to game money obtainable through play. A structure of the database or contents of the log data stored in the database may be different for each game. In addition, data unnecessary for data processing by the server 100 may be included in the log data. Accordingly, one of the server 100 or the server 130 of the game service provider may select data to be used for data processing, extract only the selected data, and generate a standardized database. At least one parameter included in the standardized database may include at least one of time-related information on an event, information on a subject performing the event, and information on an object used by the subject performing the event. The standardized database may include a plurality of tables, and each of the plurality of tables may correspond to one event.

The server 100 may receive the raw data and generate the standardized database. However, the present disclosure is not limited thereto, and the server 130 of the game service provider may generate the standardized database based on the raw data, and the server 100 may receive the standardized database generated by the server 130 of the game service provider. For convenience of description in the present disclosure, it is described that the server 100 performs operations related to the present disclosure, but it should not be construed as limiting that the server 100 performs all operations. At least some of the operations described in the present disclosure may be performed in the server 130 of the game service provider.

In addition, the server 100 or the server 130 of the game service provider may generate the standardized database by extracting necessary data from among the user's log data included in the raw database. The server 100 or the server 130 of the game service provider may use a predetermined algorithm to generate the standardized database. The server 100 or the server 130 of the game service provider may transform a value of the raw data into a standardized value that the server 100 may process based on the predetermined algorithm. In addition, the server 100 or the server 130 of the game service provider may transform the structure of the raw database including the raw data into the structure of the standardized database based on the predetermined algorithm. Here, the standardized database may correspond to a plurality of standardized tables to be described below.

The server 100 may acquire reference data for analyzing the user's propensity based on at least one piece of data included in the standardized database. The reference data may be a criterion for classifying a user into one of a plurality of predetermined propensities. The server 100 may generate the reference data based on a plurality of tables. In addition, the server 100 may analyze a propensity of an analysis target user based on the reference data and may determine recommended character information, recommended item information, and recommended content information according to the analysis result.

Hereinafter, the operation of the server 100 will be described in more detail.

Figure 2:
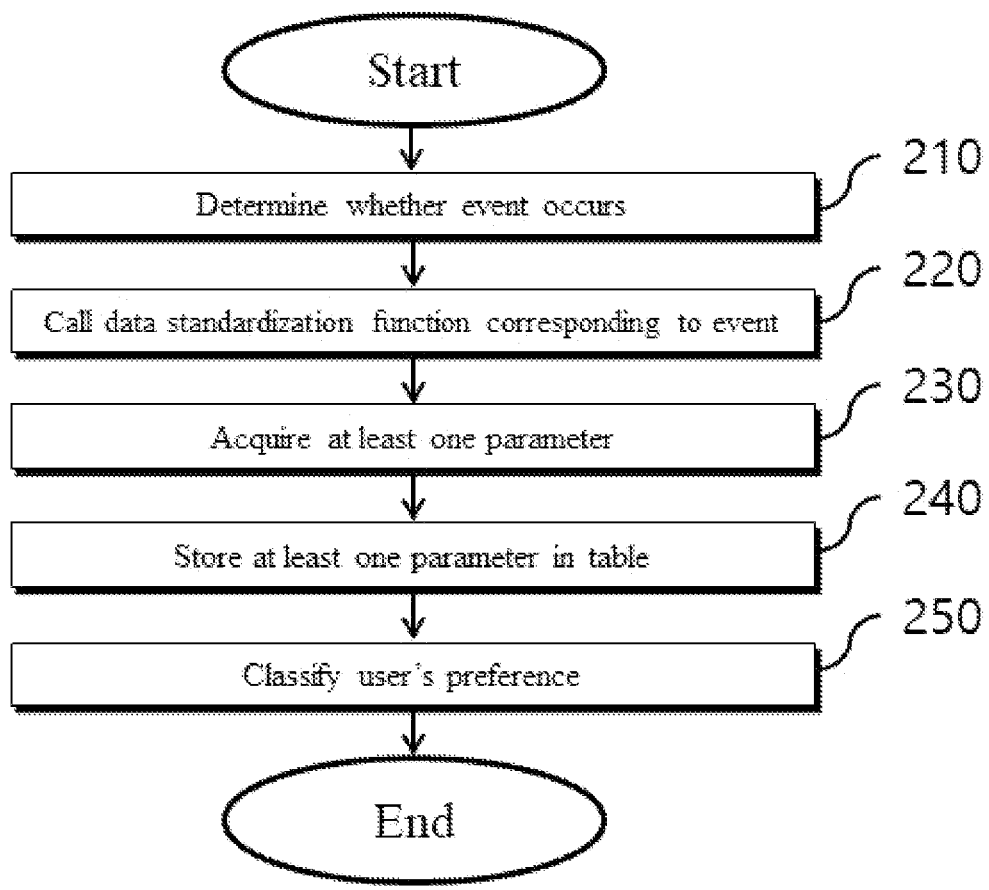
FIG. 2 is a flowchart illustrating an operation of the server according to the embodiment of the present disclosure.

FIG. 2 is a flowchart illustrating an operation of the server according to the embodiment of the present disclosure.

The operations of FIG. 2 are described as being performed by the server 100 for convenience of description. However, some of the operations of FIG. 2 may be performed in the server 130 of the game service provider. The server 100 and the server 130 of the game service provider may perform the operations of FIG. 2 while exchanging data.

The operations of FIG. 2 relate to a method of operating a server 100 for standardizing game user data in order to classify the user's game propensity. Standardizing data means collecting data generated in relation to user behavior by meaning. For example, when a user wears specific equipment and uses an item when he/she performs a specific stage within a game, the server 100 may store information on wearing of equipment, information on use of items, etc., which are related to a user's behavior of entering a specific stage, together. In this way, the server 100 may recognize that the equipment wearing behavior and item use behavior of the user occur when the specific stage is performed and may distinguish the equipment wearing behavior and item use behavior of from other equipment wearing behaviors and item use behaviors.

The server 100 may perform an operation 210 of determining whether an event occurs within a game while a user is playing the game.

A plurality of events may occur within a game, and the server 100 may determine whether an analysis target event, in which analysis target data is generated, used, or changed, among a plurality of events, occurs.

In order to determine whether the analysis target event occurs, the server 100 may check whether an event execution function corresponding to the event is called. In addition, in order to determine whether the analysis target event occurs, the server 100 may check whether the event execution function corresponding to the event is generated. When the event execution function corresponding to the event is called or the event occurrence information corresponding to the event is generated, the server 100 may perform an operation of determining that the event has occurred within the game.

Here, the event may include an account generation event, a user login/logout event, a character acquisition/removal event, a character level-up event, a content start/end event, a game money acquisition/removal event, a mailbox opening event, an advertisement viewing event, individual events such as an item acquisition/removal/use/level-up, etc.

In the present disclosure, the server 100 may generate a table by bundling the analysis target event, not the individual events, and parameters related to the analysis target event. For example, while a user starts content (stage, quest) of a game, some items may be consumed, some items may be acquired, items may be loaded, and a character may be used. As described above, the server 100 according to the present disclosure may standardize and store parameters related to an event called "content start." To this end, the following operations may be performed.

When an event occurs within the game, the server 100 may perform an operation 220 of calling a data standardization function corresponding to the event. The data standardization function is a function for acquiring at least one parameter corresponding to an event. The data standardization function may receive the raw data and acquire at least one standardized parameter. Since the raw data may include unnecessary data, the server 100 may acquire at least one parameter by selecting some of the raw data using the data standardization function. The server 100 may acquire at least one parameter arranged in a predetermined order among the raw data. However, the present disclosure is not limited thereto, and the server 100 may acquire at least one parameter in an arbitrary order among the raw data.

The server 100 may perform an operation 230 of acquiring at least one predetermined parameter in the data normalization function. At least one parameter acquired from the data standardization function may be predetermined.

The data standardization function of the server 100 may be acquired by retrieving at least one predetermined parameter within the raw data. When the at least one predetermined parameter within the raw data does not yet exist, the server 100 may wait until the at least one parameter is generated. The server 100 may generate data completed by acquiring all of at least one predetermined parameter. The server 100 may store the completed data in a table.

However, the present disclosure is not limited thereto. When at least one predetermined parameter does not yet exist in the raw data, the server 100 may ignore the non-existing parameter and generate incomplete data. The server 100 may store the incomplete data in the table. The server 100 may retrieve whether a parameter that did not exist after a predetermined time is in the raw data. When the parameter that did not exist is found in the raw data, the server 100 may supplement the incomplete data in the table. Through this, the service provider can generate a table including only the completed data. Alternatively, when the parameter that did not exist is found in the raw data, the server 100 may use the found data to add the completed data to the table. That is, the table may include both the incomplete data and completed data. Accordingly, the service provider may more accurately know when data is completed.

The data standardization function may correspond to an event on a one-to-one basis. The server 100 may select one data standardization function based on the event among pieces of data standardization functions. Alternatively, a user may use a different data standardization function for each event. The server 100 may acquire at least one different parameter based on the event. However, the present disclosure is not limited thereto, and the data standardization function may correspond to a plurality of events. The server 100 may acquire the same at least one parameter even for different events. When acquiring the same at least one parameter in different events, the server 100 may further acquire an index for indicating in which event at least one parameter is acquired. The server 100 may further store an index corresponding to an event together with at least one parameter.

At least one parameter may be for describing a "who," "when," "where," "what," "how," or "why" associated with an event. For example, when a user upgrades an item to acquire a ranked item, "who" may be a user's account, "when" may be an occurrence time of an event, "where" may be a menu display process, an item upgrade process, a quest process, etc., "what" may be a non-upgraded item, and "how" may be game money used to upgrade an item or an item for upgrade, and "why" may be an upgraded item. The server 100 does not acquire all of "who," "when," "where," "what," "how," or "why," but acquires only the predetermined information necessary to analyze a user's propensity. For example, since "where" is not important in analyzing a user's propensity, the server 100 may not obtain information related to "where."

Hereinafter, a process in which the server 100 acquires at least one parameter necessary for analyzing the user's propensity will be described in more detail.

At least one parameter may include at least one of time-related information on an event, information on a subject performing an event, and information on an object used by a subject performing an event. At least one parameter may essentially include the time-related information on the event and the information on the subject performing the event. In addition, at least one parameter may selectively include the information on the object used by the subject performing the event. Each of the time-related information on the event, the information on the subject performing the event, and the information on the object used by the subject performing the event may include various types of information and may vary according to the event.

The time-related information on the event may include at least one of information on an occurrence time of an event, information on an end time of an event, or information on duration of an event. The duration of the event may be a value obtained by subtracting the occurrence time of the event from the end time of the event. When a user performs a quest, the server 100 may call a data standardization function corresponding to the performance of the quest. The server 100 may acquire the time-related information on the event by using the data standardization function. The time-related information on the event may include at least one of a time when the user enters the quest, a time when the user ends the quest, or a time taken by the user to perform the quest.

The information on the subject performing the event may include at least one of information on a user's account and information on a character.

The information on the user's account may be information corresponding to the user on a one-to-one basis. A user may generate an account to use a game service, and the information on the user's account may be generated. The information on the user's account may include at least one of unique identification information of the user's account or information on a level of the user's account.

The character may be information on a person in a game used by a user. A user may proceed with a game by using a character. Since a user may use at least one character, the information on the user's account may correspond to information on at least one character. The information on the character may be included in the information on the subject performing the event but is not limited thereto. The information on the character may be included in the information on the object used by the subject performing the event. For example, a user may upgrade a character. In this case, the information on the subject of the event may be the information on the user's account, and the information on the object used by the subject of the event may be the information on the character.

The information on the character may include at least one of unique identification information of a character, unique identification information of a character currently used among characters possessed by a user, information on a category of a character, information related to the number of characters possessed by a user, information on a level of a character, information on an acquisition path of a character, information related to an experience value of a character, or information on an ability value of a character.

The information on the acquisition path of the character may be displayed as an index. The acquisition path of the character may include at least one of advertisements (ads), bonuses, character archetypes, purchases with game money, items, and functions (e.g., mailbox, note, notification window, or chat room) to deliver information to a user, purchase with real money (purchasables), quests, stages, user-to-user trades, or upgrades.

The acquisition path of the character may include the character archetype. For example, the user may select a specific archetype to proceed with the game, and the server 100 may provide a character to the user's account in response to the user's selection. The character archetype indicates information related to characteristics of the character. The character archetype may include information on an occupation or race of a character.

In addition, the acquisition path of the character may include a function to deliver the information to the user. For example, a user may select a message related to providing a character from one of mailboxes, a note, a notification window, or a chat room, and the server 100 may provide the character to the user's account in response to the user's selection.

The information on the ability value of the character may be a value including attack power, defense power, or agility of a character. Also, the ability value of the character may be represented by a real number or an integer.

The information on the category of the character may be information on the race or occupation of the character.

The game service may provide a plurality of characters. In the game service, each of the plurality of characters may correspond to unique identification information on a one-to-one basis. The information on the character may include the identification information of the character possessed by the user. Also, when a user possesses a plurality of characters, the information on the character may include the unique identification information of the character currently used by a user among the plurality of characters.

A level of each character possessed by the user may increase as the user proceeds with a game. The game service may provide a reward called an experience value for a character when the user proceeds with a game, and the level of the character may increase according to the experience value. The information on the current level of the character possessed by the user may include information related to the current experience value of the character or information on the current level. The information on the current level and the information related to the current experience value of the character may be represented by an integer or a real number.

The information on the object used by the subject performing the event includes at least one of information related to game money, information on skill, information on characters, information on items, billing information, advertisement information, or information on content.

The game money may be online money used within a game. Game money are a means of exchange for purchasing items, contents, etc., with a game, and serve as a measure of exchange value for game money or services. A user may acquire online money through various paths. For example, the user may acquire online money by paying a charge predetermined by the game service provider, acquire online money after playing content or may acquire online money from other users.

There may be at least one type of online money used within one game. For example, there may be online currencies that have different values or are used for different purposes within a game.

The information related to game money may include at least one of unique identification information of game money, information on a quantity of game money, information on acquisition of game money, information on consumption of game money, or information on an acquisition path of game money.

The information on the acquisition/use path of game money may be displayed as an index. The acquisition path of the game money may include at least one of advertisements (Ads), bonuses, character archetypes, purchases with game money, items, and functions (e.g., mailbox, note, notification window, or chat room) to deliver information to a user, purchase with real money (purchasables), quests, stages, user-to-user trades, or upgrades.

A skill may be a skill used by a user or a character within a game. The information on skills may include at least one of unique identification information of a skill, information on a category of a skill, information on acquisition of a skill, information on consumption of a skill, information on the number of times a skill is used, or information on a level of a skill.

The information on the acquisition path of the skill may be represented by an index. The acquisition path of the skill may include at least one of advertisements (Ads), bonuses, character archetypes, purchases with game money, items, and functions (e.g., mailbox, note, notification window, or chat room) to deliver information to a user, purchase with real money (purchasables), quests, stages, user-to-user trades, or upgrades.

An item may be an object that the user uses or loads within a game. An item may be consumables or equipment. An item may be a disposable item or an item that can be used continuously. For example, when a user uses an item, a physical strength value of a character may increase, an experience value of a character may increase, a level value of a character may increase, or an ability value of a character may increase. However, the present disclosure is not limited thereto, and the game service may provide items of various functions as needed.

The information on the item may include at least one of a unique identifier of an item, information on a category of an item, information on a level of an item, the number of items, information on an acquisition path of an item, information on an acquisition of an item, information on a consumption of an item, information on loading of an item, or a price of an item.

The information on the category of the item may be represented by an index. The information on the category of the item may include equipment, consumables, cosmetics, tokens, raw materials, infrastructure, and random boxes. The equipment may include things such as weapons, protective equipment, accessories, and other equipment. The consumable may refer to consumables, such as potions and bandages, which disappear after use. Cosmetics may refer to a costume that has nothing to do with ability improvement when worn. The token is an item used as currency at a specific time/content and may include an admission ticket. The material may refer to material items consumed for equipment upgrade, character rank-up, and the like. The infrastructure is an item that indirectly affects the entire game and may be a fixed asset. A random box may refer to an item that may receive other items at random when opened.

The information on the acquisition/use path of the item may be represented by an index. The acquisition path of the item may include at least one of advertisements (Ads), bonuses, character archetypes, purchases with game money, items, and functions (e.g., mailbox, note, notification window, or chat room) to deliver information to a user, purchase with real money (purchasables), quests, stages, user-to-user trades, or upgrades.

The billing information is information related to a user's use of real money to enjoy a game. The billing refers to a game service provider charging a user a fee for providing a game service. The user may purchase at least one of items, contents, and characters that may be used within a game through billing.

The billing information may include information on an amount paid by a user to a game provider. The billing information may further include information on a type of currency paid by the user to the game provider.

The information on the content may indicate information on content that a user enjoys within a game. In the present disclosure, the content may indicate a stage or quest that a user enjoys. The information on the content may include at least one of unique identification information of content, information on a category of content, information on a difficulty level of content, information on a time taken to complete content, information on a score obtained after completing the content, information on an entry path of content, information on a play type of content, and information on a completion status of content.

The information on the play type of the content may be represented by an index. The information on the play type of the content may indicate at least one of player versus player (PvP) and player versus environment (PvE). However, the present disclosure is not limited thereto, and the information on the play type of the content may indicate that there is no automatic fighting function, an automatic fighting function is used, an auto fighting function is not used, auto fighting may be turned off/on during stage play, or partial automatic fighting is possible.

The information on the completion status of the content may be represented by as an index. The information on the completion status of the content may include success, victory, failure, defeat, draw, dropout, timeout, and abnormal termination. Also, the information on the completion status of the content may include information for indicating that content is not yet finished or indicating a start of content.

The advertisement information may be represented by an index. The advertisement information may indicate that an advertisement is exposed to a player due to an end of a cool-down time, etc., indicate a start of viewing an advertisement, indicate an end or stop while viewing an advertisement, or indicate completion of viewing an advertisement.

The server 100 may perform an operation 240 of storing at least one parameter in a table corresponding to an event. The server 100 may store, in a table, at least one parameter predetermined by a data standardization function together with an occurrence time of an event. The occurrence time of the event stored in the table may be the time-related information on the event. The server 100 may accumulate and store at least one parameter in a table over time.

The server 100 may generate a table for each type of event and may perform an operation of generating a plurality of tables. That is, events and tables may be matched on a one-to-one basis.

The server 100 may use a data standardization function corresponding to an event among pieces of data standardization functions. Also, the server 100 may store at least one acquired parameter in a table corresponding to the used data standardization function. That is, events and tables may be matched on a one-to-one basis. The operation of writing to the table will be described with reference to FIG. 3.

FIG. 3 is a diagram illustrating a table according to an embodiment of the present disclosure.

One table included in the plurality of tables may include at least one parameter for a plurality of user's accounts. One table may include information on accounts of a plurality of users. That is, one table may include the information on accounts of the plurality of users corresponding to one event. The server 100 may fill the table over time when an event occurs within a game. For example, the information on the user's account described in a first row 311 in a first table 310 may be different from or the same as the information on the user's account described in a second row 312.

The first table and the second table may correspond to different events. The first table may correspond to a first event and the second table may correspond to a second event. For example, the first event may be a "quest performance" event, and the second event may be an "item purchase" event. Information described in each column of the first table and the second table may be at least one parameter acquired by a data standardization function. As described above, the data standardization functions corresponding to each event may acquire at least one predetermined parameter required for each event from raw data. The server 100 may fill values in the table based on the data standardization function.

As described above, although the server 100 has been mainly described, operations 210 to 240 may be performed in the server 130 of the game service provider. When operations 210 to 240 are performed in the server 130 of the game service provider, the server 130 of the game service provider may transmit a plurality of tables to the server 100, and the server 100 may perform analysis to classify users' propensities based on the plurality of tables.

Hereinafter, examples of at least one parameter that may be stored in a table for each specific event will be described.

The user's "login/logout" event may include information on a history of a user who has logged in or logged out of a game service. The table corresponding to the "login/logout" event may include the information on the user's account and the time-related information on the event as at least one parameter. For example, the table may include unique identification information of a user. In addition, the table may include information on a login time or information on a logout time. The table may include the unique identification information of the user and the login time or logout time of the user for a predetermined period. Also, the table may further include an index for indicating whether a current row is for login or logout.

A user's "entrance into a dungeon with n friends" event may include information related to users' entrance into a dungeon. For example, a table corresponding to the "entrance into a dungeon with n friends" event may include at least one of information on a user's account, information on a user's character, information on a user's account for each of n friends, information on a character for each of n friends, or information on entered content (dungeon).

A user's "entrance into a stage using an admission ticket" event may include information related to users' entrance into a stage. For example, a table corresponding to the "entrance to a stage using an admission ticket" event may include at least one of information on a user's account, information on a user's character, information on entered content (stage), or information on a used item (admission ticket (token)).

A user's "stage start" event may include information related to users' stage start. For example, a table corresponding to the "stage start" event may include at least one of information on a user's account, information on a user's character, information on entered content (stage), information on used skills, or information on used items (equipment, consumables, cosmetics, tokens, or infrastructure).

A user's "stage clear without playing" event may include information related to users' stage clear. For example, the table corresponding to the "stage clear without play" event may include at least one of information on a user's account, information on a user's character (unique identification information, acquired experience value, etc.), information on entered content (stage), an item (consumables) used to clear without play, information related to acquired game money, or information related to acquired items (equipment, consumables, cosmetics, tokens, or infrastructure).

A user's "stage end" event may include information related to users' stage start. For example, a table corresponding to the "stage end" event may include at least one of information on a user's account, information on a character (unique identification information, acquired experience value, etc.) used by a user, information on entered content (stage), information related to acquired game money, or information related to acquired items (equipment, consumables, cosmetics, tokens, or infrastructure).

A "quest-related" event such as a user's "quest acceptance," "quest update," "quest failure," "quest abandonment," or "quest completion" may include information related to users' quest. For example, a table corresponding to the "quest-related" event may include at least one of information on a user's account, information on a user's character, information on performed content (quest), information on newly acquired content (quest), information related to acquired game money, or information related to acquired items (equipment, consumables, cosmetics, tokens, or infrastructure).

A "store-related" event, such as a user's "item purchase," "use of a special store," or "in-app payment," may include information related to users' use of a store. For example, a table corresponding to a "shop-related" event may include at least one of information on a user's account, information related to used game money, used billing information, used advertisement information, information on acquired characters, information on acquired skills, information on acquired content, information related to acquired game money, or information related to acquired items.

An "item-related" event, such as a user's "item combination," "draw from a random box," "timer-shortened item," or "acquisition of item by mail," may include information related to users' use of items. For example, a table corresponding to an "item-related" event may include at least one of information on a user's account, information related to used items, information related to used game money, used billing information, used advertisement information, information on acquired characters, information on acquired skills, information on acquired content, information related to acquired game money, or information related to acquired items.

"Reward-related" events such as a user's "ranking reward," "bonus reward," or "advertisement reward" may include information related to histories for which users have been rewarded. For example, a table corresponding to the "reward-related" event may include at least one of information on a user's account, used advertisement information, information on acquired characters, information on skills acquired, information on content acquired, information related to acquired game money, and information related to acquired items.

"Enhancement-related" events such as "item enhancement," "status enhancement," "infrastructure expansion," or "character level-up" of the user may include information related to users-enhanced histories. For example, a table corresponding to the "enhancement-related" event may include at least one of information on a user's account, information related to used items, information related to used game money, used billing information, used advertisement information, information on enhanced characters, information on enhanced skills, information on usable content, or information on enhanced items.

The user's "game money-related" event may include information related to users' acquisition/consumption of game money. For example, a table corresponding to the "game money-related" event may include at least one of information on a user's account, information related to used game money, used billing information, used advertisement information, or information on acquired game money. The advertisement information used herein may include at least one of an identifier of an advertisement viewed by a user to acquire game money, a time when the advertisement was viewed, or information on whether the advertisement viewing has been completed.

The user's "item loading/unloading" event may include information related to the user's item loading/unloading history. For example, a table corresponding to the "item loading/unloading" event may include at least one of information on a user's account, information on user's characters on which items are loaded or unloaded, and information on items that are loaded or unloaded.

Referring back to FIG. 2, the server 100 may perform an operation of classifying users' propensities based on the generated table. A process in which the server 100 classifies the user's propensity based on a standardized table will be described with reference to FIGS. 4 to 7.

Figure 4:
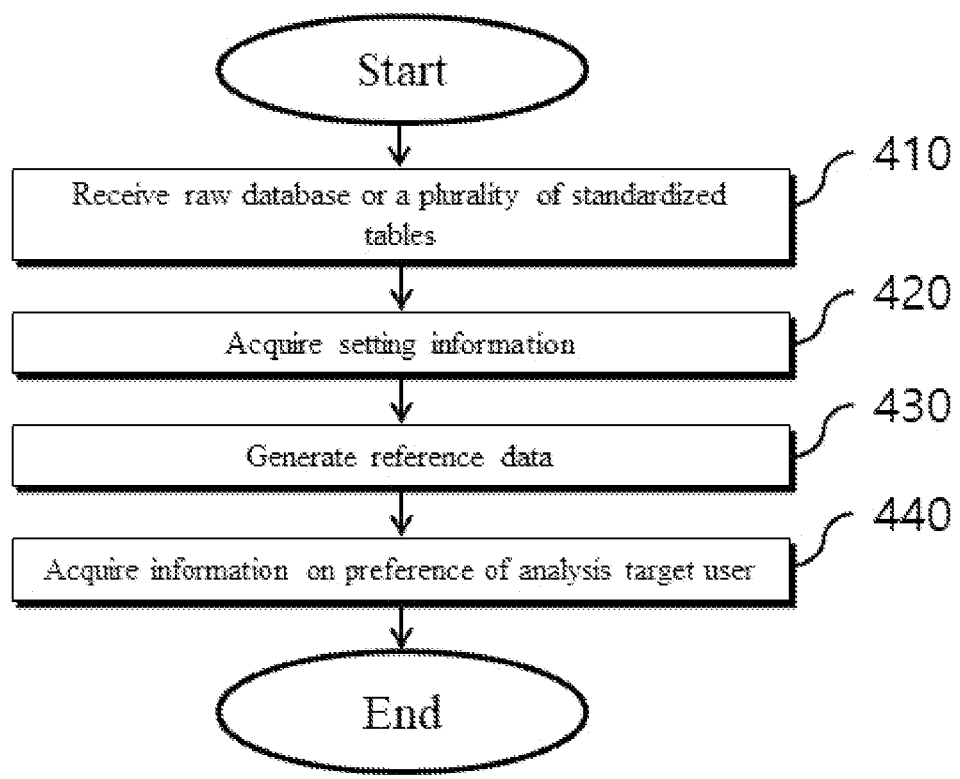
FIG. 4 is a flowchart illustrating a method of operating a server according to an embodiment of the present disclosure.

FIG. 4 is a flowchart illustrating a method of operating a server according to an embodiment of the present disclosure.

The server 100 may classify users by analyzing a user's psychology using a plurality of models. The plurality of models may be models for analyzing the user's propensity. One model may classify users into at least one propensity. The server 100 may classify users into a plurality of propensities using the plurality of models. The server 100 may analyze a user's psychology by applying feature data for a user's account to at least one of the plurality of models. In order for the server 100 to apply the plurality of models to the feature data for the user's account, reference data for each of the plurality of models may be generated. The reference data may be a value for classifying the user's propensity.

The server 100 may represent the users' propensities by an index. The user's propensity may include a psychological state in which a user is likely to leave a game, a psychological state in which a user quickly becomes bored with a game service, a psychological state in which online money is used a great deal in relation to a specific character, a psychological state in which a user wants to use a game service for a long period of time because the user enjoys a game, a psychological state in which a game may not be continuously used due to irregular daily life, or a psychological state in which a user does not feel a game service is fun. The server 100 may select at least one propensity among a plurality of propensities based on the feature data and model for the user's account. The model may classify a user into at least one propensity among a plurality of propensities based on the reference data. The server 100 may classify a user into one propensity using one model. The server 100 may classify a user into at least one propensity using a plurality of models. The server 100 may select at least one of a plurality of propensities based on the model and the feature data for the user's account. The selected propensity may represent a propensity of a user who uses a game. The server 100 may output a user's propensity, and the game service provider may provide a user-customized service based on the user's propensity.

The server 100 may classify the user's propensity based on the reference data corresponding to the feature data and the model for the user's account. The feature data for the user's account is data acquired based on the standardized table and may be data representing one user's propensity. For example, the model can classify the user's propensity based on whether the feature data for the user's account is larger or smaller than the reference data.

The server 100 may classify a user into at least one of a plurality of predetermined propensities. The server 100 may perform an operation of acquiring the feature data for the user's account from a plurality of tables. In addition, the server 100 may perform an operation of selecting the user's propensity from among the plurality of predetermined propensities based on the reference data and the feature data for the user's account. The server 100 may use a model to select the user's propensity. In addition, the server 100 may select at least one of the users' propensities, and for this purpose, the server 100 may use at least one model.

The server 100 may perform an operation 410 of receiving a raw database or a plurality of standardized tables from the server 130 of the game service provider. When the server 100 receives the raw database, the server 100 may generate a plurality of standardized tables based on the raw database. When the server 100 receives the plurality of standardized tables, the server 100 may use the plurality of standardized tables that are received.

In addition, the server 100 may perform an operation 420 of acquiring setting information on at least one module in order to acquire reference data corresponding to one of a plurality of models from the plurality of standardized tables.

One of the plurality of models may include at least one module. A module may be hardware or software that performs one function. The server 100 may utilize pieces of data included in the plurality of standardized tables to classify the users' propensities. The module may derive one piece of data included in the plurality of standardized tables. Accordingly, the server 100 may use a plurality of modules to derive the plurality data from the plurality of standardized tables.

One module may be used redundantly for a plurality of models. However, a type of data, a scope of analyzed data, etc., required by the model may be different. Therefore, the server 100 may vary the setting information of the module according to the model.

The server 100 may acquire the setting information from a memory. However, the present disclosure is not limited thereto. The server 100 may receive the setting information from an external device in a wired or wireless manner. In addition, the server 100 may receive the setting information from the user. In addition, the setting information may be acquired based on the plurality of standardized tables.

The server 100 may perform an operation 430 of generating reference data from data of users included in a plurality of standardized tables based on at least one module set based on the setting information. At least one parameter may be recorded in the plurality of standardized tables. At least one parameter may be log data of a plurality of users. The server 100 may generate reference data based on at least one parameter. Since the server 100 generates reference data using a trend of log data of a plurality of users, a psychology of an analysis target user may be analyzed using a general psychology of users.

The server 100 may perform an operation 440 of acquiring the propensity information of the analysis target user based on the acquired reference data. For example, the server 100 may classify users' propensities based on whether user data acquired based on a plurality of standardized tables is greater than or equal to reference data. For example, when the user data is greater than or equal to the reference data, the user data may be a first propensity, and when the user data is less than the reference data, the user data may be a second propensity.

Hereinafter, the operation 430 of generating the reference data by the server 100 will be described in more detail.

Figure 5:
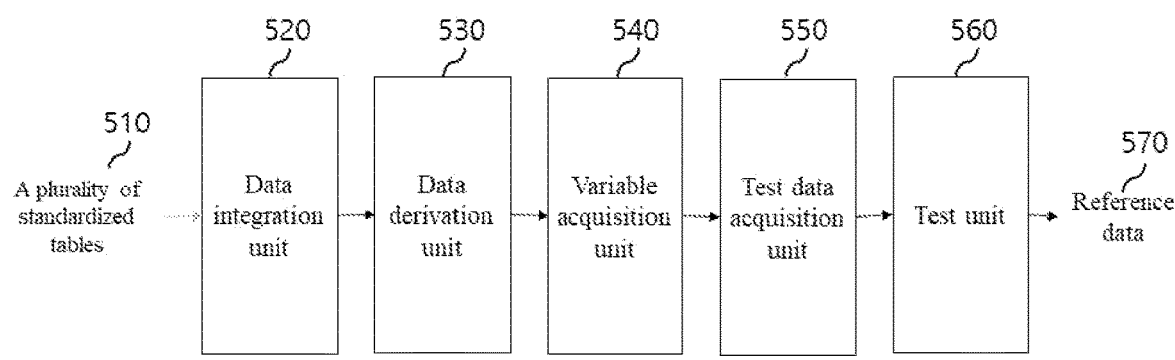
FIG. 5 is a diagram illustrating a process of generating reference data according to an embodiment of the present disclosure.

FIG. 5 is a diagram illustrating a process of generating reference data according to an embodiment of the present disclosure.

The operation 430 of generating the reference data of FIG. 4 may be performed based on at least one of a data integration unit 520, a data derivation unit 530, a variable acquisition unit 540, a test data acquisition unit 550, or a test unit 560 that is included in the server 100. The data integration unit 520, the data derivation unit 530, the variable acquisition unit 540, the test data acquisition unit 550, or the test unit 560 may be a module included in the model.

The server 100 may receive a raw database or a plurality of standardized tables 510. The server 100 may include the data integration unit 520. The data integration unit 520 may integrate the plurality of standardized tables 510 recorded in at least one server. In addition, the data integration unit 520 may integrate data distributed in the plurality of standardized tables 510. In addition, the data integration unit 520 may extract data necessary to acquire reference data from the plurality of standardized tables 510 and integrate the data. Here, the extraction may represent a process of copying necessary data from the plurality of standardized tables 510. The data integration unit 520 may acquire an integrated database. The type of data required to acquire the reference data may be predetermined.

The server 100 may include the data derivation unit 530. The data derivation unit 530 may generate necessary data using the integrated database. The data derivation unit 530 may acquire a derivation database by using data included in the integrated database. Here, the derivation may refer to a process of calculating, combining, or selecting data.

As described above, the integrated database may include a plurality of standardized tables acquired from at least one server. Since the derivation database is obtained based on the integrated database, the derivation database is acquired based on the plurality of standardized tables. In addition, since the plurality of standardized tables include at least one of time-related information on an event, information on a subject performing an event, and information on an object used by the subject performing the event, the derivation database may be acquired based on at least one of the time-related information on the event, the information on the subject performing the event, and the information on the object used by the subject performing the event.

For example, when information on a level of a character is accumulated and stored in the integrated database based on the plurality of standardized tables, the derivation database may include information related to the amount of change in level of the character possessed by the user over time. The information related to an amount of change in level of a character possessed by the user over time may indicate a growth rate of a character possessed by the user. For example, the amount of change in level over time may be an amount of change in level of a character with respect to the time when a user uses a game service. In addition, the amount of change in level over time may be the amount of change in level of the character over time from the moment the user uses the game service. In addition, the amount of change in level over time may be the amount of change in level of the character with respect to the number of times a user uses a game. The number of times the user uses the game may be determined once from when the user attempts a predetermined goal provided by a game service until it is determined whether the predetermined goal is achieved.

For example, when the information on items is accumulated and stored in the integrated database based on the plurality of standardized tables, the server 100 may acquire the number of items used by the user as information related to user's item usage. The information related to the user's item usage may be included in the derivation database. The number of items used by the user may be the number of items used for a specific period. The server 100 may acquire the number of items used by the user for various periods in order to analyze the user's propensity.

For example, when the information on items is accumulated and stored in the integrated database based on the plurality of standardized tables, the server 100 may include the information related to the plurality of items used by the user in the derivation database. The information related to the plurality of items used by the user may be a use history of the items used by the user. Alternatively, the information related to the plurality of items used by the user may be a list of pieces of unique identification information of the items used by the user. Alternatively, the information related to the plurality of items used by the user may include the unique identification information of the items used by the user and the number of times the user has used the items corresponding to the unique identification information.

For example, when the billing information is accumulated and stored in the integrated database based on the plurality of standardized tables, the server 100 may include information related to the number of times a user has been billed or information related to a user's billing amount in the derivation database. The information related to the number of times a user has been billed may be a value proportional to the number of times a user has paid a game service company. In addition, the information related to the user's billing amount may have a value proportional to the amount paid by the user to the game service company for a predetermined period.

For example, when information on content is accumulated and stored in the integrated database based on the plurality of standardized tables, the server 100 may include play information in the derivation database. The play information may be information related to a history of a user's use of content in a game. The play information may include information related to which content a user plays, the difficulty of the content that the user plays, whether a user wins or loses while playing the content, experience values obtained when the user wins, and a play time.

In addition, the play information may include at least one of information on the number of times a user plays in a PvP mode, information related to a win rate in the PvP mode, information on the number of times one of characters possessed by the user plays, and information related to a time using one piece of content, information related to the number of instances of content failure, information related to the number of times the content is attempted, information related to a user's daily average play time, or information related to a user's total play time.

The PvP mode indicates a mode in which users compete against each other in a game. A PvE mode indicates a mode in which users compete against a game environment (here, it indicates artificial intelligence that provides a game service). The game content is largely classified into the PvP mode and the PvE mode.

The information on the number of times the user plays the PvP mode is information corresponding to the number of times the user plays the PvP mode. The server 100 may determine once until a user enters the PvP mode and a win/loss result comes out.

The information related to the win rate in the PvP mode may be information related to a ratio of the number of times the user wins in the PvP mode to the number of times the user plays the PvP mode. The information related to the win rate may be a win rate for a predetermined period. The predetermined period may include one day, one week, four weeks, one month, one year, or the like. The information related to the win rate in the PvP mode may have a proportional relationship with the rate.

The information on the number of times one of the characters possessed by the user plays may be stored in a database for each character possessed by the user. The user may play a game using one character. The server 100 may determine once until a user starts a game using one character and the result of the game comes out.

A game service provider may provide content to a user. The content refers to a variety of entertainment provided to users by the game service provider. For example, the content may be largely classified into the PvE mode or the PvP mode. The PvE mode or the PvP mode may be classified again into various subdivided modes. Also, according to characteristics, the content may include content that provides online money, content that provides items, or content that can be used only a predetermined number of times a day.

The information related to the time using one piece of content may be stored corresponding to each piece of content. The time using one piece of content may be an accumulation of a time from when a user plays one piece of content until a result comes out. The information related to the time using one piece of content may be proportional to the time using one piece of content.

The information related to the number of times of the attempts at content indicates information related to the number of times the user has attempted one piece of content included in the PvE mode or the PvP mode. The information related to the number of times of the attempts of content may be stored corresponding to each pieces of content. The fact that the number of times of the attempts of content is once indicates the number of times the user has played one piece of content. The information related to the number of times of the attempts of content may have a value proportional to the number of times of the attempts of content.

The information related to the number of times of the failures of content indicates information related to the number of times that a result obtained after the user attempts content is a failure. The information related to the number of times of the failures of content may be stored corresponding to each piece of content. The fact that the number of times of the failures of content is once indicates the number of times that the result obtained after a user plays one piece of content is a failure. The information related to the number of times of the failures of content may have a value proportional to the number of times of the failures of content.

The user's daily average play time may indicate an average of a time a user uses a game service a day. The information related to the user's average daily play time may be information proportional to the daily average play time. The information related to the user's daily average play time may be information proportional to a daily average play time.

A total play time of a user may indicate the accumulated total time from when a user logs in to a game service until the user logs out of the game service. The information related to the user's total play time may be information proportional to the total play time.

In addition, when the information related to game money are accumulated and stored in the integrated database based on the plurality of standardized tables, the server 100 may include at least one of online money acquisition information and online money use information in the derivation database.

The online money acquisition information may include at least one of information on an online money acquisition amount, information on an online money acquisition time, and information on a cause of online money acquisition. The online money use information may include at least one of information on online money consumption, information on an online money consumption time, and information on a cause of online money consumption.

The information on the acquisition/consumption cause may be represented by an index. For example, the index may include at least one of an index indicating that online money was acquired from another user, an index indicating that online money was obtained after playing content, and an index indicating that online money was obtained after paying a billed amount.

The online money use information may include at least one of usage information on usage of online money, information on an online money use time, and information on content, items, etc., acquired using online money.

A user may acquire various types of items or content by using online money. For example, a user may use online money to purchase an item for decorating a character, purchase an item for increasing a character's ability level, or purchase a right to use specific content. When a user uses the online money, information related to use may be recorded in the plurality of standardized tables. The server 100 receives at least one of information on the usage of the online money, information on the use time of the online money, or information on the content, items, etc., acquired using the online money, in the derivation database based on the plurality of standardized tables. The information on the content, items, etc., acquired using the online money may be represented by an index. That is, the index may include at least one of an index indicating that one item is acquired or an index indicating that one piece of content is acquired.

The derivation database may include data necessary for the server 100 to obtain the reference data for analyzing the user's psychology. In addition, the derivation database may include values that are better to use for generating the user's psychological model than the integrated database.

The server 100 may include the variable acquisition unit 540. The variable acquisition unit 540 may select variables required for the module from the derivation database. At least one module included in one model may use only some data of the derivation database. The variable acquisition unit 540 may select variables based on the type of modules included in the psychological analysis model. The type of variables according to the type of modules may be predetermined.

The server 100 may include the test data acquisition unit 550. The test data acquisition unit 550 may generate a test database by combining at least one selected variable. The module may use at least one parameter of a plurality of users. A variable may correspond to one user. The test data acquisition unit 550 may acquire the test database by collecting variables of a plurality of users. In addition, a plurality of modules may share variables. Also, one module may use a plurality of variables. By combining the variables selected in the variable acquisition unit 540, the test data acquisition unit 550 may acquire a test database suitable for the type of modules.

The server 100 may include a test unit 560. The test unit 560 may perform a test based on the test database. The test may be an operation of generating reference data 570 capable of dividing a user's psychological state by analyzing at least one parameter for a plurality of users.

The server 100 may classify a propensity of any user based on feature data for any user's account by using the reference data. Here, the feature data for the user's account may be obtained by collecting or processing data of one user included in a plurality of standardized tables. The processing process may be similar to the process of acquiring the above derivation database.

The test is an operation of generating and verifying the reference data that may divide users' propensities by analyzing feature data for a plurality of users' accounts. Also, the prediction is an operation of dividing a propensity of a target user by analyzing the feature data for the user's account based on the reference data.

A method of acquiring reference data will be described in more detail with reference to FIGS. 6 and 7.

Figure 6:
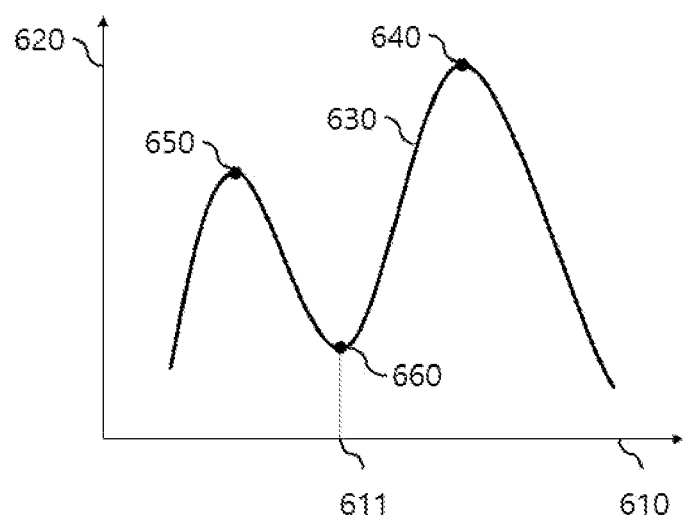
FIG. 6 is a diagram illustrating a distribution of data acquired from a plurality of tables that are standardized according to an embodiment of the present disclosure.

FIG. 6 is a diagram illustrating a distribution of data acquired from a plurality of tables that are standardized according to an embodiment of the present disclosure.

Referring to FIG. 6, a horizontal axis 610 may indicate data acquired based on column values of a plurality of standardized tables. The horizontal axis 610 may correspond to a first axis. A vertical axis 620 may indicate a frequency of the acquired data.

The server 100 may acquire a first distribution based on the plurality of standardized tables. The first distribution may be the same as a graph 630. The server 100 may acquire a first maximum point 640. For example, the horizontal axis 610 may indicate a billing amount. The server 100 may derive a billing amount paid by one user per unit time based on the second table 320. The server 100 may calculate a billing amount per unit time for each of a plurality of users. The vertical axis may correspond to the number of users corresponding to the billing amount per unit time. In addition, the server 100 may draw a graph as illustrated in FIG. 6 based on a billing amount and frequency for a plurality of users.

The server 100 may determine, as a first maximum point 640, a point having the highest frequency among the maximum points of the graph 630 indicating the first distribution. Also, the server 100 may acquire a second maximum point 650. The server 100 may determine, as a second maximum point 650, a point having the second highest frequency among the maximum points of the graph 630 indicating the first distribution.

The server 100 may acquire a first minimum point 660 between the first maximum point 640 and the second maximum point 650. For example, the server 100 may acquire a first minimum point as the first minimum point 660 while going from the first maximum point 640 to the second maximum point 650. In addition, the server 100 may obtain the first minimum point as the first minimum point 660 while going from the second maximum point 650 to the first maximum point 640. Also, the server 100 may acquire, as the first minimum point 660, a point indicating the minimum frequency between the first maximum point 640 and the second maximum point 650.

The server 100 may determine a horizontal axis value 611 of the first minimum point 660 as reference data.

Figure 7:
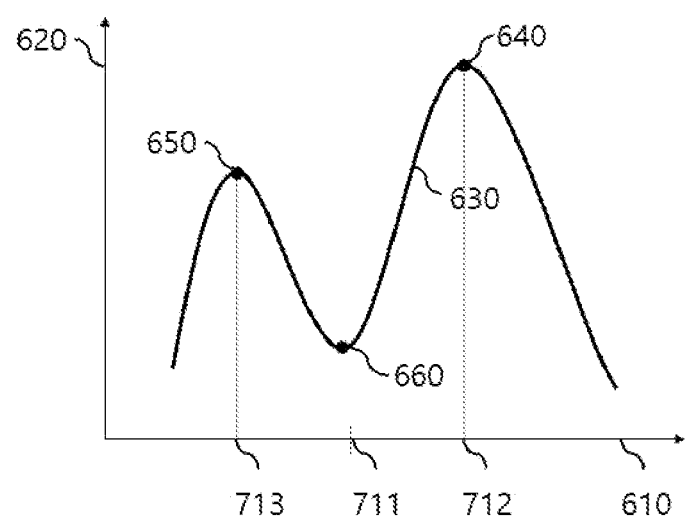
FIG. 7 is a diagram illustrating a distribution of data acquired from a plurality of tables that are standardized according to an embodiment of the present disclosure.

FIG. 7 is a diagram illustrating a distribution of data acquired from a plurality of tables that are standardized according to an embodiment of the present disclosure.

Referring to FIG. 6, the horizontal axis 610 may indicate data acquired based on column values of a plurality of standardized tables. The horizontal axis 610 may correspond to the first axis. The vertical axis 620 may indicate the frequency of the acquired data.

The server 100 may acquire the first distribution based on the plurality of standardized tables. The first distribution may be the same as the graph 630. The server 100 may acquire the first maximum point 640. The server 100 may determine, as the first maximum point 640, a point having the highest frequency among the maximum points of the graph 630 indicating the first distribution. Also, the server 100 may acquire the second maximum point 650. The server 100 may determine, as the second maximum point 650, a point having the second highest frequency among the maximum points of the graph 630 indicating the first distribution.

The server 100 may determine, as reference data, an average value 711 of a value 712 of the horizontal axis of the first maximum point 640 and a value 713 of the horizontal axis of the second maximum point 650. The server 100 may classify users' propensities based on the reference data. For example, the server 100 may derive data for a specific user from the plurality of standardized tables and classify the users' propensities based on whether the specific data is greater than or equal to the reference data.

The server 100 may acquire at least one piece of reference data. The server 100 may classify the users' propensities based on the at least one piece of reference data.

Figure 8:
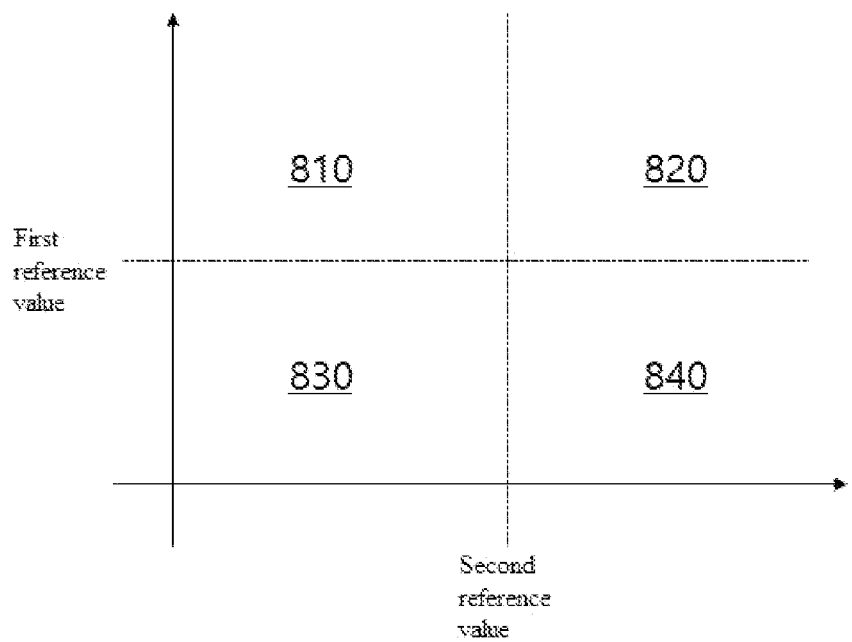
FIG. 8 is a diagram for describing a process of classifying users' propensities using two pieces of reference data according to an embodiment of the present disclosure.

FIG. 8 is a diagram for describing a process of classifying users' propensities using two pieces of reference data according to an embodiment of the present disclosure.

FIG. 8 may indicate one model. The server 100 may acquire reference data for the model. The model may use at least one piece of reference data. For example, the reference data may include a first reference value and a second reference value. The first reference value may be reference data for a PvP content play rate. The second reference value may be reference data for a win rate in the PvP mode.

Referring to FIG. 8, there may be four users' propensities. For example, the user's propensity may include a first propensity 810, a second propensity 820, a third propensity 830, and a fourth propensity 840. A dual server 100 may discriminate a predetermined target propensity. The target propensity may be a classification in which a user's specific propensity is prominent. For example, the target propensity may be the third propensity 830. The remaining first propensity 810, second propensity 820, and fourth propensity 840 may be propensities that need to be further analyzed because a user's specific propensity is not prominent.

The server 100 may perform an operation 250 of acquiring propensity information of an analysis target user by using the first reference value and the second reference value. For example, the model of FIG. 8 may be a model for determining whether a user has a high probability of leaving a game. When a PvP content play rate of an analysis target user is greater than the first reference value and a win rate in a PvP mode is lower than a second reference value, the server 100 may determine the analysis target user as the first propensity 810 which is a propensity that has a high probability of leaving a game. The server 100 may output an analysis result. The user or the server 100 may take action according to the analysis result.

In FIGS. 6 and 7, for convenience of explanation, it has been described that the server 100 draws a graph for distribution and acquires reference data. However, the server 100 may not draw a graph. In addition, in FIGS. 6 and 7, the server 100 acquires reference data based on statistical processing. However, the server 100 may predict the user's propensity without acquiring the reference data. The server 100 may use machine learning to acquire a machine learning model to determine the relationship between users' propensities and parameters included in a plurality of standardized tables. For example, the server 100 may use supervised learning. A user may label a user's own account with a specific propensity. The server 100 may perform machine learning on the relationship between the label of the specific propensity and the parameters of the user labeled with the specific propensity. For the machine learning, parameters for a plurality of users may be required. The server 100 may secure parameters for a plurality of users from a plurality of standardized tables. The server 100 may derive necessary data from the plurality of standardized tables for the machine learning.

The server 100 may predict the user's propensity based on the acquired machine learning model. For example, the server 100 may obtain a plurality of standardized tables for a user who has not yet been labeled. In addition, the server 100 may derive necessary data by pre-processing a plurality of standardized tables for users. In addition, by applying the derived data to the machine learning model, it is possible to acquire a predictive label for a user's propensity.

So far, various embodiments have been mainly described. It will be understood by those skilled in the art to which the present disclosure pertains that the present disclosure may be implemented in a modified form without departing from essential characteristics of the present disclosure. Therefore, embodiments disclosed herein should be considered in an illustrative aspect rather than a restrictive aspect. The scope of the present invention should be defined by the claims rather than the above-described description, and equivalents to the claims should be interpreted to fall within the present disclosure.

Meanwhile, the above-described embodiments of the present disclosure can be written as a program that may be executed on a computer and can be implemented in a general-purpose digital computer that operates the program using a computer-readable recording medium. The computer-readable recording medium includes storage media such as magnetic storage media (e.g., a ROM, a floppy disk, a hard disk, etc.) and optically readable media (e.g., a compact disc read-only memory (CD-ROM), a digital video disc (DVD), etc.).

What is claimed is:

1. A method of operating a server, which includes a processor and a memory, that standardizes game data of a user to classify a user's game propensity, the method comprising:

storing raw data including log data related to activities of users in different games in a raw database in real time;

transforming the raw data related to a plurality of events occurred for a plurality of users in the raw database to standardized values using a data standardization function, the data standardization function filtering the raw data, wherein the raw data includes metadata of a game and play records of the game, and structure of raw data is different for different games;

transforming structure of the raw database including the raw data into structure of a standardized database comprising a plurality of standardized tables;

obtaining a plurality of standardized tables for the plurality of users including the standardized values;

generating a distribution graph based on the plurality of standardized tables, a first axis of the distribution graph representing a first parameter of the standardized tables, and a second axis of the distribution graph representing a second parameter of the standardized tables;

determining reference data based on a maximum point or a minimum point of the distribution graph;

determining whether an event occurs within a game while a user is playing the game;

calling the data standardization function corresponding to the event when the event occurs within the game, the data standardization function receiving raw data related to the event in association with the user and acquiring at least one predetermined parameter by selecting some of the raw data;

acquiring the at least one predetermined parameter based on the data standardization function;

storing the at least one predetermined parameter in a standardized table for the user corresponding to the event;

classifying a user's propensity based on the table; and outputting, to the user, game content recommended based on the classified user's propensity, wherein the classifying of the user's propensity includes:

generating the reference data which is a criterion for classifying the user into one of a plurality of predetermined propensities;

generating feature data for an account of the user from the standardized table for the user; and selecting the user's propensity from among the plurality of predetermined propensities based on a comparison of the reference data and the feature data for the account of the user, and wherein the method further comprises:

acquiring a machine learning model to determine a relationship between users' propensities and parameters included in a plurality of standardized tables; and classifying the user's propensity based on the table and the machine learning model.

2. The method of claim 1, wherein the determining of whether the event occurs includes determining that the event has occurred within the game when an event execution function corresponding to the event is called or event occurrence information corresponding to the event is generated.

3. The method of claim 1, wherein the at least one predetermined parameter includes at least one of time-related information on the event, information on a subject performing the event, and information on an object used by the subject performing the event.

4. The method of claim 3, wherein the time-related information on the event includes at least one of information on an occurrence time of the event, information on an end time of the event, or information on duration of the event, the information on the subject performing the event includes at least one of information on an account of the user and information on a character, and the information on the object used by the subject performing the event includes at least one of information related to game money, information on a skill, information on an item, billing information, or information on content.

5. The method of claim 4, wherein the information on the account of the user includes at least one of unique identification information of the account of the user or information on a level of the account of the user, the information related to the game money includes at least one of unique identification information of the game money, information on a quantity of the game money, or information on an acquisition path of the game money, the information on the character includes at least one of unique identification information of the character, information on a category of the character, information on the level of the character, information on an acquisition path of the character, or information on an ability value of the character, the information on the skill includes at least one of unique identification information of the skill, information on a category of the skill, or information on a level of the skill, the information on the item includes at least one of a unique identifier of the item, information on a category of the item, information on a level of the item, a number of items, information on an acquisition path of the item, or a price of the item, the billing information includes information on a charge paid by the user to a game provider, and the information on the content includes at least one of unique identification information of the content, information on a category of the content, information on a difficulty level of the content, information on a time taken to complete the content, information on an entry path of the content, or information on a completion status of the content.

6. The method of claim 1, wherein the log data includes metadata of a game, play records of a game, and data related to game money.

* * * * *